(12) United States Patent
Lu

(10) Patent No.: US 8,885,314 B2
(45) Date of Patent: Nov. 11, 2014

(54) LIGHTNING PROTECTIVE HIGH-VOLTAGE DIVIDER

(75) Inventor: Shan-Jui Lu, New Taipei (TW)

(73) Assignee: Lantek Electronics Inc., New Taipei (TW)

( * ) Notice: Subject to any disclaimer, the term of this patent is extended or adjusted under 35 U.S.C. 154(b) by 316 days.

(21) Appl. No.: 13/468,646

(22) Filed: May 10, 2012

(65) Prior Publication Data

US 2013/0258542 A1 Oct. 3, 2013

(30) Foreign Application Priority Data

Mar. 27, 2012 (TW) .............................. 101205485 U

(51) Int. Cl.
*H02H 3/22* (2006.01)

(52) U.S. Cl.
USPC ......................................................... 361/118

(58) Field of Classification Search
CPC ........... H02H 7/16; H02H 9/04; H02H 9/041; H02H 9/042; H01R 13/6666
USPC ................................................... 361/118, 117
See application file for complete search history.

(56) References Cited

U.S. PATENT DOCUMENTS

| 2006/0125609 A1* | 6/2006 | Kline et al. ............... 340/310.17 |
| 2006/0290476 A1* | 12/2006 | Zitting et al. ............ 340/310.18 |

* cited by examiner

*Primary Examiner* — Jared Fureman
*Assistant Examiner* — Kevin J Comber
(74) *Attorney, Agent, or Firm* — Guice Patents PLLC

(57) ABSTRACT

The present invention relates to a lightning protective high-voltage divider, which comprises: a printed circuit board; an impedance coil; a coupling capacitor having one end being coupled to the signal input terminal; a transformer having a primary coil and a secondary coil, wherein one end of the primary coil is coupled to the other end of the coupling capacitor, the other end of the primary coil is grounded, the secondary coil is coupled to at least a signal output terminal, so the input signal inputted by the signal input terminal is enabled to be coupled to the signal output terminal through the primary coil and the secondary coil; when a lightning surge current occurs, the impedance coil is able to guide the surge current to the ground, thereby protecting the coupling capacitor from being damaged.

7 Claims, 3 Drawing Sheets

LIGHTNING PROTECTIVE HIGH-VOLTAGE DIVIDER

BACKGROUND OF THE INVENTION

1. Field of the Invention

The present invention relates to a lightning protective high-voltage divider, especially to a lightning protective high-voltage divider in which a signal input terminal is coupled to an impedance coil so as to be connected to the ground potential, so when a lightning surge current occurs, the surge current can be guided to the ground through the impedance coil, thereby protecting a coupling capacitor from being damaged.

2. Description of Related Art

Referring to FIG. 1, which is a block diagram showing the conventional high-voltage divider. As shown in FIG. 1, the high-voltage divider comprises: a first coupling capacitor 100; a transformer 110; a compensating capacitor 120; and a second coupling capacitor 130. The first coupling capacitor 100 can be used for coupling a cable television radio frequency (RF) signal outputted by a signal output terminal to the transformer 110, the transformer 110 and the second coupling capacitor 130 are coupled to at least a signal output terminal. However, when a lightning strikes, the first coupling capacitor 100 of the high-voltage divider would be damaged by the instantaneous high-voltage surge current, thereby causing the cable television radio frequency (RF) signal not being able to be coupled to the signal output terminal, and the signal to be sent to the user end being terminated. Such disadvantage shall be improved.

In view of the disadvantage of the conventional high-voltage divider, the present invention provides a novel lightning protective high-voltage divider for improving the disadvantage.

SUMMARY OF THE INVENTION

One primary objective of the present invention is to provide a lightning protective high-voltage divider, in which a signal input terminal is coupled to an impedance coil so as to be connected to the ground potential, so when a lightning surge current occurs, the surge current can be guided to the ground through the impedance coil, and a coupling capacitor is protected from being damaged, thereby achieving the objective of protection when subject to the lightning striking.

For achieving the objective, the present invention provide a lightning protective high-voltage divider, which comprises: a printed circuit board; an impedance coil disposed on the printed circuit board and having one end being coupled to a signal input terminal and the other end being coupled to the ground; a coupling capacitor disposed on the printed circuit board and having one end being coupled to the signal input terminal; a transformer disposed on the printed circuit board and having a primary coil and a secondary coil, wherein one end of the primary coil is coupled to the other end of the coupling capacitor, the other end of the primary coil is grounded, the secondary coil is coupled to at least a signal output terminal, so the input signal inputted by the signal input terminal is enabled to be coupled to the signal output terminal through the primary coil and the secondary coil; when a lightning surge current occurs, the impedance coil is able to guide the surge current to the ground, thereby protecting the coupling capacitor from being damaged.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Figure 1:
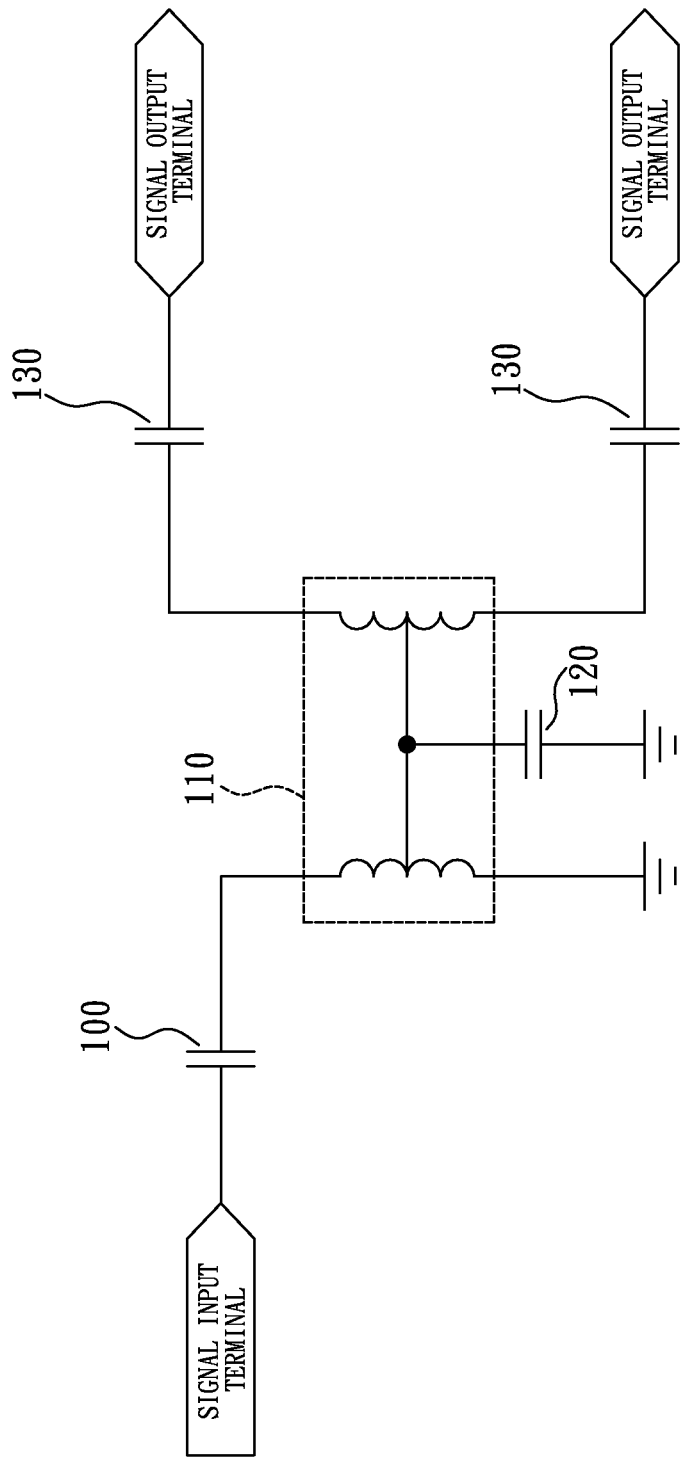
FIG. 1 is a block diagram illustrating the conventional high-voltage divider.
Figure 2:
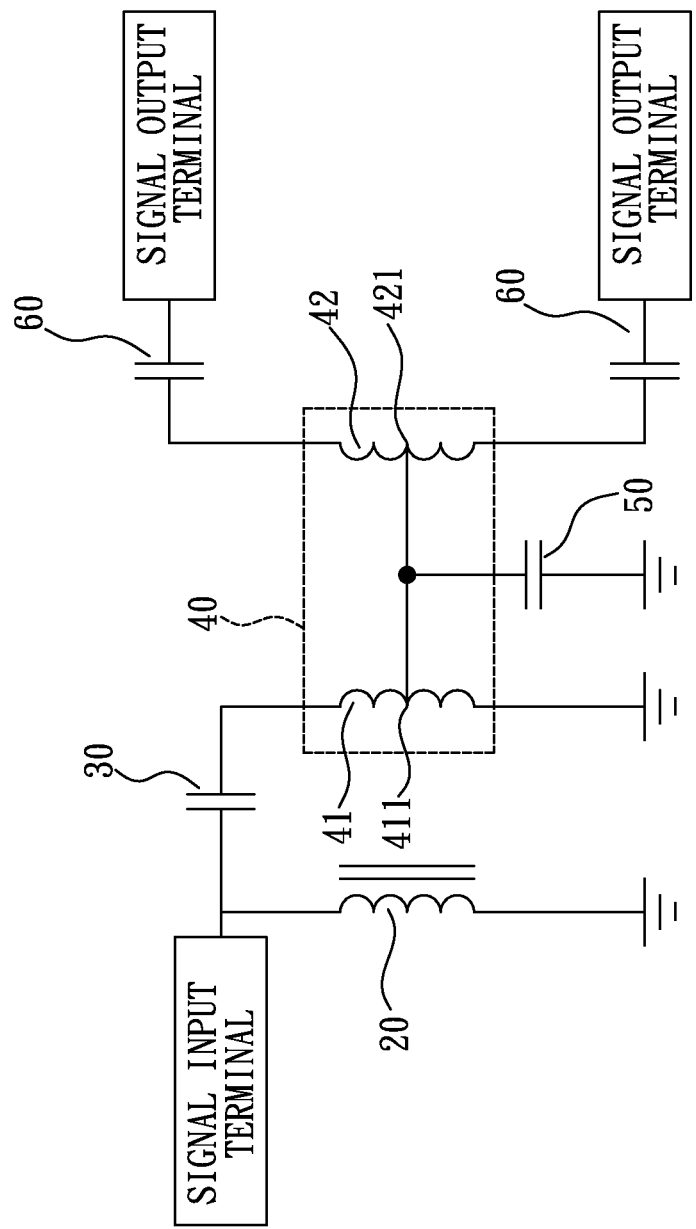
FIG. 2 is a block diagram illustrating the lightning protective high-voltage divider according to one preferred embodiment of the present invention.
Figure 3:
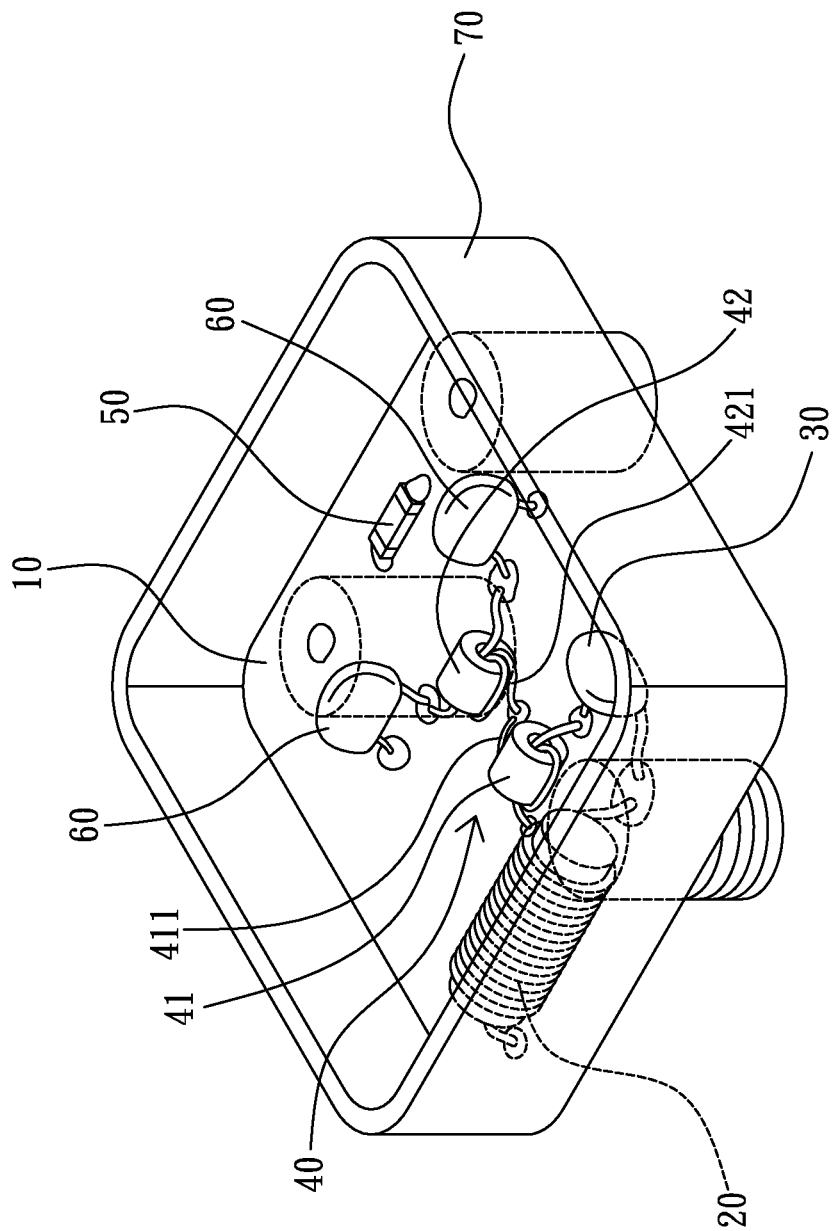
FIG. 3 is a schematic view illustrating the lightning protective high-voltage divider further including a metal housing according to one preferred embodiment of the present invention.

Referring to FIG. 2 and FIG. 3, wherein FIG. 2 is a block diagram showing the lightning protective high-voltage divider according to one preferred embodiment of the present invention; and FIG. 3 is a schematic view illustrating the lightning protective high-voltage divider further including a metal housing according to one preferred embodiment of the present invention.

As shown in FIG. 2, the lightning protective high-voltage divider provided by the present invention comprises: a printed circuit board 10; an impedance coil 20; a coupling capacitor 30; and a transformer 40.

Wherein, the printed circuit board 10 is used for receiving components such as the impedance coil 20, the coupling capacitor 30 and the transformer 40.

The impedance coil 20 is disposed on the printed circuit board 10, one end thereof is coupled to a signal input terminal, e.g. but not limited to a cable television radio frequency (RF) signal input terminal, the other end thereof is coupled to the ground potential. Wherein, the impedance coil 20 is e.g. but not limited to a low-impedance coil which is consisted of a coil reeled on an iron core (not shown in figures), and the impedance value is determined by the number of coil turns.

The coupling capacitor 30 is disposed on the printed circuit board 10, one end thereof is coupled to the signal input terminal, thereby coupling the cable television signal outputted by the signal input terminal to the transformer 40.

The transformer 40 is disposed on the printed circuit board 10, and has a primary coil 41 and a secondary coil 42, wherein one end of the primary coil 41 is coupled to the other end of the coupling capacitor 30, the other end of the primary coil 41 is grounded, the secondary coil 42 is coupled to at least a signal output terminal, e.g. but not limited to a cable television signal output terminal, thereby the cable television signal inputted by the signal input terminal being enabled to be coupled to the signal output terminal through the primary coil 41 and the secondary coil 42. Wherein, the transformer 40 is e.g. but not limited to a center-tapped transformer, and the primary coil 41 and the secondary coil 42 respectively have a center tap 411, 421.

In addition, the high-voltage divider provided by the present invention further includes a compensating capacitor 50, one end thereof is coupled to the center tap 411 of the primary coil 41 and the center tap 421 of the secondary coil 42, and the other end is grounded.

Moreover, in the high-voltage divider provided by the present invention, a second coupling capacitor 60 can be further installed between the secondary coil 42 and the signal output terminal.

When a lightning strikes, with the low impedance characteristic of the impedance coil 20, the lightning protective high-voltage divider provided by the present invention can guide the instantaneous high-voltage surge current to the ground through the impedance coil 20, thereby protecting the coupling capacitors 30, 60 from being damaged by the lightning striking.

As shown in FIG. 3, the lightning protective high-voltage divider provided by the present invention further includes a metal housing 70 for accommodating components such as the printed circuit board 10, the impedance coil 20, the coupling capacitor 30, the transformer 40, the compensating capacitor 50 and the second coupling capacitor 60.

Wherein, the metal housing 70 is, e.g. but not limited, made of iron.

As what is disclosed above, when the lightning protective high-voltage divider provided by the present invention is in actual practice, the signal input terminal is coupled to the impedance coil so as to be connected to the ground potential, so when a lightning surge current occurs, the surge current can be guided to the ground through the impedance coil, thereby achieving the objective of protecting the coupling capacitor from being damaged. As such, the high-voltage divider provided by the present invention is novel comparing to the conventional divider.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific examples of the embodiments disclosed and that modifications and other embodiments are intended to be included within the scope of the appended claims. Although specific terms are employed herein, they are used in a generic and descriptive sense only and not for purposes of limitation.

What is claimed is:

1. A lightning protective high-voltage divider, comprising:
a printed circuit board;
an impedance coil located on said printed circuit board and having one end being coupled to a signal input terminal and the other end being coupled to the ground, said signal input terminal is a cable television radio frequency signal input terminal;
a coupling capacitor located on said printed circuit board and having one end being coupled to said signal input terminal;
a transformer located on said printed circuit board and having a primary coil and a secondary coil, wherein one end of said primary coil being coupled to the other end of said coupling capacitor, the other end of said primary coil being grounded, said secondary coil being coupled to at least a signal output terminal, so the input signal inputted by said signal input terminal being enabled to be coupled to said signal output terminal through said primary coil and said secondary coil;
wherein said impedance coil, said coupling capacitor, and said transformer are located on said printed circuit board;
wherein, when a lightning surge current occurs, said impedance coil is located on the printed circuit board and guides the lightning surge current to the ground, thereby protecting said coupling capacitor from being damaged.

2. The lightning protective high-voltage divider as claimed in claim 1, wherein said impedance coil is a low-impedance coil.

3. The lightning protective high-voltage divider as claimed in claim 1, wherein said impedance coil is consisted of a coil reeled on an iron core, and the impedance value is determined by the number of coil turns.

4. The lightning protective high-voltage divider as claimed in claim 1, wherein said transformer is a center-tapped transformer, and said primary coil and said secondary coil respectively have a center tap.

5. The lightning protective high-voltage divider as claimed in claim 4, further including a compensating capacitor, one end thereof is coupled to said center tap of said primary coil and said center tap of said secondary coil, and the other end is grounded.

6. The lightning protective high-voltage divider as claimed in claim 5, wherein a second coupling capacitor is further installed between said secondary coil and said signal output terminal.

7. The lightning protective high-voltage divider as claimed in claim 6, further including a metal housing, said printed circuit board, said impedance coil, said coupling capacitor, said transformer, said compensating capacitor and said second coupling capacitor are located in said metal housing.

* * * * *